United States Patent [19]
Hoyt

[11] Patent Number: 5,415,592
[45] Date of Patent: May 16, 1995

[54] AUXILIARY BELT DRIVE MECHANISM

[75] Inventor: Rodney G. Hoyt, Knapp, Wis.

[73] Assignee: Doboy Packaging Machinery, Inc., New Richmond, Wis.

[21] Appl. No.: 262,684

[22] Filed: Jun. 20, 1994

[51] Int. Cl.[6] .............................................. F16H 7/00
[52] U.S. Cl. ..................................... 474/85; 474/141; 474/160
[58] Field of Search ..................... 474/84-86, 474/141, 152, 160

[56] References Cited

U.S. PATENT DOCUMENTS

| | | |
|---|---|---|
| 782,262 | 2/1905 | Morse .............................. 474/160 X |
| 2,530,786 | 11/1950 | Rose .................................... 474/85 |
| 2,548,316 | 4/1951 | Locke ............................... 474/85 X |
| 2,747,420 | 5/1956 | Beck .................................... 474/85 |
| 2,953,930 | 9/1960 | Meyer . |
| 3,101,145 | 8/1963 | Koski et al. . |
| 3,418,861 | 12/1968 | Newhouse . |
| 3,651,703 | 3/1972 | Kornylak . |
| 3,779,171 | 12/1973 | Littlehorn, Jr. . |
| 3,949,573 | 4/1976 | Jacobsson . |
| 3,965,764 | 6/1976 | Avramidis ............................ 474/85 |
| 3,981,205 | 9/1976 | Avramidis et al. ............... 474/85 X |
| 4,259,810 | 4/1981 | West . |
| 4,634,403 | 1/1987 | Peabody et al. ................. 474/85 X |
| 4,655,733 | 4/1987 | Jonason ............................ 474/85 X |

*Primary Examiner*—Roger J. Schoeppel
*Attorney, Agent, or Firm*—Haugen and Nikolai

[57] ABSTRACT

A timing pulley having a grooved periphery having a stepped profile defining two concentric annular belt engaging surfaces. Each of the surfaces receive a separate timing belt thereon. The belt engaging surfaces carry teeth for meshing with corresponding teeth on the timing belts. When the belts are deployed on the pulley, the outermost belt is in covering relation relative to the innermost belt. The multiple belt timing pulley is for accommodating multiple timing pulleys in a common plane.

16 Claims, 3 Drawing Sheets

AUXILIARY BELT DRIVE MECHANISM

BACKGROUND OF THE INVENTION

I. Field of the Invention

This invention relates generally to pulleys and more particularly, to a timing pulley for accommodating multiple timing belts thereon.

II. Discussion of the Prior Art

Pulleys change the direction and point of application of a pulling force and may be used for transmitting rotation from one shaft, the driving shaft, to a driven shaft. In an ordinary pulley and belt configuration, the belt is wrapped around a driving pulley and a driven pulley. The driving pulley may be connected, for example, to a motor's output shaft and the driven pulley may be connected to an auxiliary device. The two pulleys and belt transfer rotation from the motor's output shaft to the auxiliary device's shaft. In this situation, the pulleys turn at a particular rate in relation to their relative diameters and timing information may be passed between the shafts, as long as slippage does not occur.

A conventional pulley has a single groove in its outer rim or periphery for accepting a rope or belt. The belt is usually smooth and shaped to fit the smooth groove of the pulley. A friction fit, between the pulley and the belt, is accomplished by adjusting the distance between the driving and the driven pulleys to pull the belt taut. This friction fit should be sufficient to prevent the belt from slipping but not so taut as to place undue stress on the bearings of the shafts on which the pulleys are mounted. Unfortunately, a smooth groove and belt configuration loosens over time and slippage often occurs. This slippage leads to a loss of drive power and timing information. Where timing information is critical, slippage cannot be tolerated.

The contact area between the belt and pulley may be increased to reduce the tendency toward slippage. A wider grooved rim has a wider flat surface on its inside diameter back wall for contacting a wider belt. A deeper grooved rim has deeper side surfaces for contacting the sides of the belt. Another way of providing more surface area to reduce slippage is to have multiple pulleys and belts offset laterally relative to one another on the driving and the driven shafts. In this situation, the total contacting surface area is the sum of the surface areas of the individual pulley and belt combinations. The possibility of slippage is greatly reduced by using multiple offset pulleys and belts. However, none of these configurations insure against slippage and the loss of timing information.

Multiple pulleys and belts may be needed for driving multiple auxiliary devices. However, laterally arranged pulleys take extra space. In applications where space is limited, it is more convenient to have a number of pulleys and belts in a common plane.

A device using multiple pulleys in a common plane is shown and described in U.S. Pat. No. 2,548,316, issued to Locke. The '316 patent discloses a drive pulley mounted on a drive shaft and driving an outer belt and an inner belt. The inner belt is wrapped around the drive pulley and an idler pulley. The outer belt is wrapped around the drive pulley, outside the inner belt, and also around an auxiliary device pulley. The pulleys lie in a common plane, with the idler pulley between the drive pulley and the auxiliary device pulley. The outer and inner belts are V shaped and fit into a V groove in the drive pulley. The outer belt lies on the inner belt and gets traction from its engagement with the inner belt for driving the auxiliary device pulley. Thus, the traction for the outer belt is enhanced by the inner belt. This traction, however, is not absolute and slippage may occur as the outer belt loosens over time.

A variation on overlapping belts is shown in U.S. Pat. No. 4,634,403, issued to Peabody et al. The '403 patent discloses a smooth V shaped belt fitting into an inner groove and a smooth flat outer belt riding over the inner belt and fitting into an outer groove. In this configuration, the inner belt is in contact with the sides of the V groove. The outer belt holds the inner belt in place and receives traction from the top surface of the inner belt and the flat surfaces of the outer groove. The outer belt, however, is subject to stretching and slippage is possible.

Other overlapping belt systems are shown in U.S. Pat. Nos. 3,965,764, and 3,981,205. In the '764 patent an inner belt rides in the V groove of an ordinary nonadjustable pulley and drives one auxiliary device. The outer belt rides on top of the inner belt and drives two auxiliary pulleys. All of the pulleys lie in the same plane. In the '205 patent the inner belt rides in the V groove of an adjustable pulley and the outer belt rides on top of the inner belt without touching the sides of the adjustable pulley. As the adjustable pulley expands to decrease its diameter, the inner belt remains in contact with the sides of the adjustable pulley and the outer belt continues to ride on top of the inner belt. The inner and outer belts drive various auxiliary devices. In both of these systems, either belt may slip and lose timing information.

Traction is enhanced by having an inner belt in contact with an outer belt. However, in each of the prior art arrangements described, the inner belt is basically smooth and the outer belt has either smooth surfaces or grooves that run the length of the belt. Although traction is enhanced by having an inner belt in contact with an outer belt, the smooth surfaces of the belt and pulley may slip. In situations where timing information is critical slippage cannot be tolerated.

To avoid slippage, so-called timing pulleys and timing belts having meshing teeth or protuberances are well known in the art. For example, timing belts or chains have been used on automobiles for years for synchronizing the movement of engine components. The teeth prevent slippage and the loss of timing information. However, timing belts are not typically designed for withstanding a large amount of torque. Thus, driving multiple auxiliary devices with a single belt may cause the belt's teeth to rip apart. Laterally offset timing pulleys may be used to drive multiple devices. But, where space is a limitation and laterally offset pulleys cannot be used, a timing pulley capable of accommodating multiple belts in a common plane is needed.

It is accordingly a principle object of this invention to provide a pulley for accommodating multiple timing belts.

Another object of the invention is to provide a pulley for accommodating multiple timing belts in a common plane.

Yet another object of the invention is to provide a timing pulley having a stepped belt engaging surface defining inner and outer diameters in a grooved rim for accommodating multiple timing belts.

Yet another object of the invention is to provide a timing pulley having at least one inner belt engaging surface recessed with respect to an outer belt engaging surface so the inner timing belt runs inside and is overlapped by the outer timing belt.

SUMMARY OF THE INVENTION

The foregoing objects of the present invention are attained in a multiple belt timing pulley by providing a right circular cylinder having a grooved rim or periphery with a small diameter belt engaging surface or longitudinal segment and a large diameter belt engaging surface or longitudinal segment. Each of the belt engaging surfaces carry a set of regularly circumferentially-spaced teeth or protuberances of a predetermined circular pitch for meshing with mating belts. The inner timing belt meshes with the teeth on the inner or smaller diameter belt engaging surface and also pulley teeth on a set of auxiliary pulleys. The outer timing belt meshes with the teeth on the outer or larger diameter belt engaging surface and also with teeth on a second set of auxiliary pulleys. The timing belts have the multiple belt timing pulley in common for synchronizing movement of the two sets of auxiliary pulleys.

In one embodiment, the smaller diameter belt engaging surface or longitudinal segment is recessed relative to the larger diameter belt engaging surface or longitudinal segment to split the larger into parallel, spaced-apart side portions. The side portions carry the outer pulley teeth and the outer timing belt. The smaller diameter surface and inner pulley teeth are recessed to avoid interfering with the outer timing belt. The inner timing belt meshes with the smaller diameter toothed surface beneath the outer timing belt. Thus, the larger or outer timing belt rides over the top of the inner timing belt and meshes with the teeth on the larger diameter belt engaging surface.

In a second embodiment, the smaller diameter toothed groove is recessed on one side of the outer diameter toothed surface to form a step in the grooved rim or periphery. Each belt engaging surface carries teeth for meshing with their respective timing belts. The outer timing belt meshes with the teeth of the larger diameter surface and over the top of the inner timing belt. The inner timing belt engages the smaller diameter toothed surface beneath the outer timing belt.

In each embodiment, the inner timing belt is situated underneath the outer timing belt. The inner timing belt meshes with the multiple timing belt pulley and with one or more auxiliary pulleys on a common plane. The outer timing belt overlaps the inner timing belt and meshes with teeth on the multiple timing belt pulley and with one or more other auxiliary pulleys on the same common plane.

Thus, the multiple belt timing pulley of the invention can rotate with one set of auxiliary pulleys meshed with the inner timing belt and a second set of auxiliary pulleys meshed with the outer timing belt. This creates flexibility when choosing pulley locations in a system. Also, space limitation problems are reduced since all pulleys may be situated on a common plane.

Other objects, features and advantages of the present invention will become apparent to those skilled in the art through the description of the preferred embodiment, claims, and drawings herein.

DETAILED DESCRIPTION

Figure 1:
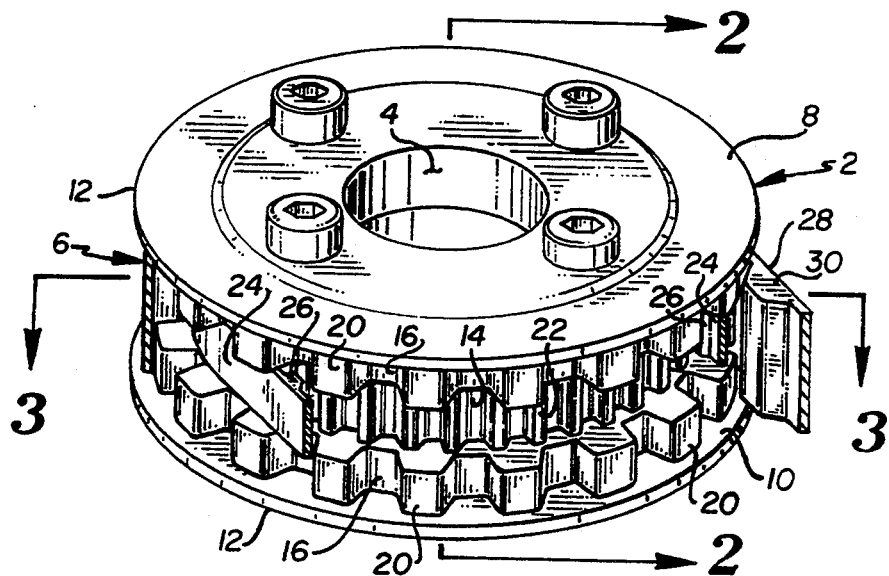
FIG. 1 is a perspective view of one embodiment of the multiple belt timing pulley of the present invention.
Figure 2:
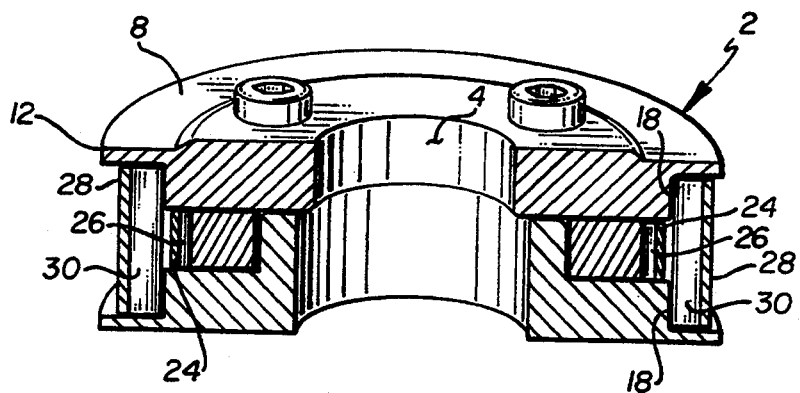
FIG. 2 is a cross-sectional view of the pulley of FIG. 1 taken along the line 2—2 and also including a pair of timing belts thereon.

As shown in FIG. 1, the multiple belt timing pulley 2 in accordance with a first embodiment is a wheel or right circular cylinder having a central bore 4 for accepting a shaft therein and a grooved periphery, indicated generally by the numeral 6. The pulley 2 has a first side plate 8 and a second side plate 10. The plates, 8 and 10, have rim flanges 12 bordering the grooved periphery 6.

The embodiment of the multiple belt timing pulley shown in FIGS. 1–4 has a stepped profile defining a smaller diameter belt engaging surface or longitudinal segment 14 recessed in a larger diameter belt engaging surface or longitudinal segment 16 on opposed sides thereof. The side portions 18 may be of equal or unequal width and are uniformly notched to create regularly circumferentially-spaced pulley teeth or protuberances 20 thereon. The smaller diameter belt engaging surface 14 also carries regularly circumferentially-spaced teeth or protuberances 22 that, typically, are recessed relative to the toothed surface 16.

Figure 3:
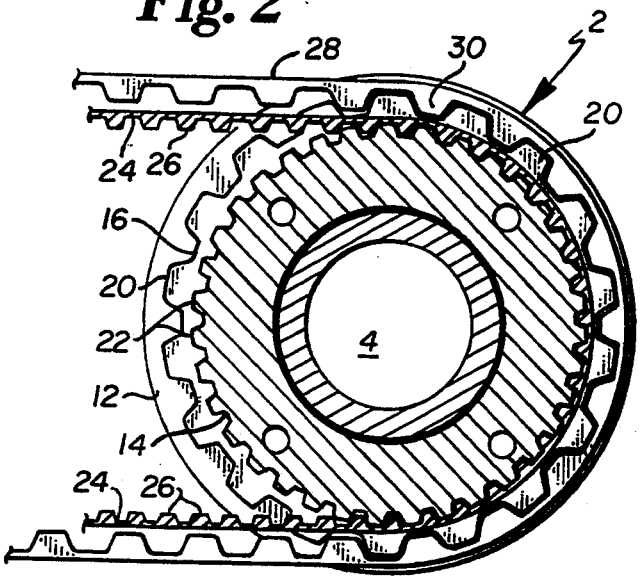
FIG. 3 is a cross-sectional view of the embodiment of FIG. 1 taken along the line 3—3 and also including a pair of timing belts thereon.

An inner belt 24, FIG. 3, has inner belt teeth 26 for meshing with the teeth 22 carried on the smaller diameter surface 14. The inner belt 24 and inner belt teeth 26 engage the teeth 22 underneath the outer belt 28. The outer belt 28 has outer belt teeth 30 for meshing with the outer pulley teeth 20 carried on the larger diameter section 16 of the pulley 2. The outer belt 28 and its teeth 30 engage the pulley teeth 20. The outer belt teeth 30 may also ride on the top surface of the inner belt 24 to hold it in place. The rim flanges 12 preclude lateral shifting of the outer belt 28 with the grooved periphery 6.

Figure 4:
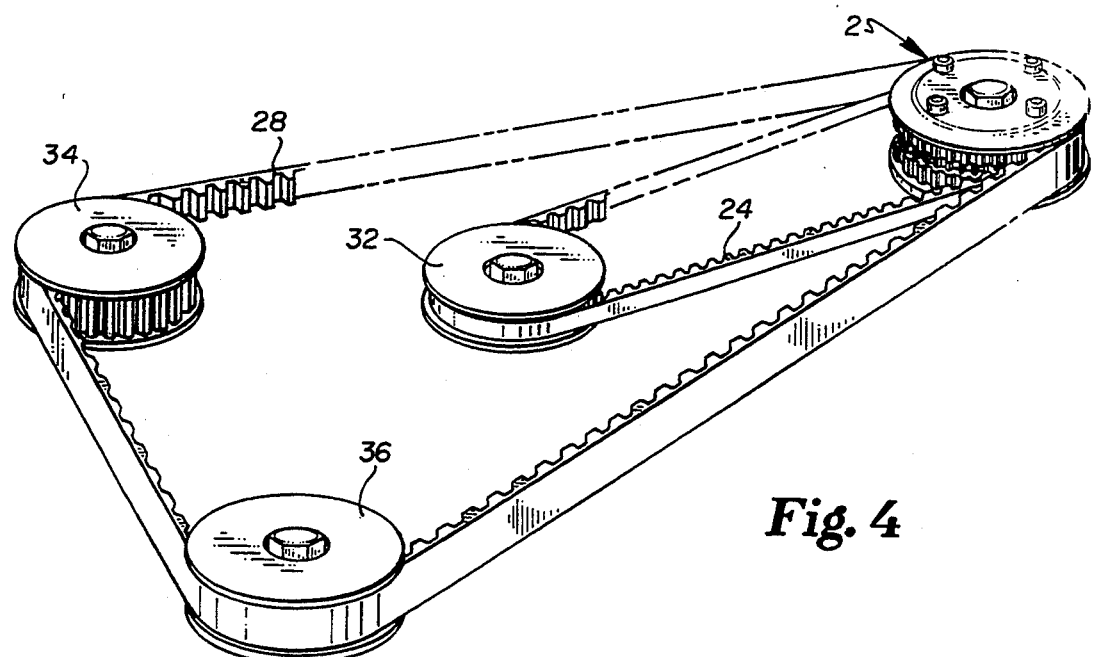
FIG. 4 is a perspective view of the embodiment of FIG. 1 in use.

Referring to FIG. 4, when in use, the multiple belt timing pulley 2 has the inner belt 24 wrapped around the smaller diameter 14 beneath the outer belt 28. The inner belt 24 is also wrapped around a first auxiliary pulley 32 which either drives or is driven by the multiple belt timing pulley 2. The outer belt 28 is wrapped around a second set of auxiliary pulleys, 34 and 36. Each of the auxiliary pulleys, 32, 34 and 36, have corresponding teeth for meshing with their respective timing belts 24 and 28. Also, any one of the auxiliary pulleys, 32, 34 or 36, may be a driving pulley. If this is the case, the multiple belt timing pulley 2 acts as an idler pulley for synchronizing the auxiliary pulleys 32, 34 and 36. Of course, the multiple belt timing pulley 2 may be the sole driving pulley. In this situation, the auxiliary pulleys 32, 34 and 36 are synchronously driven.

The rotational speed of each shaft connected to the auxiliary pulleys 32, 34 and 36 and the multiple belt timing pulley 2 is determined by the relative diameters of connected pulleys. The pulleys can be built to achieve the desired shaft speeds.

Figure 5:
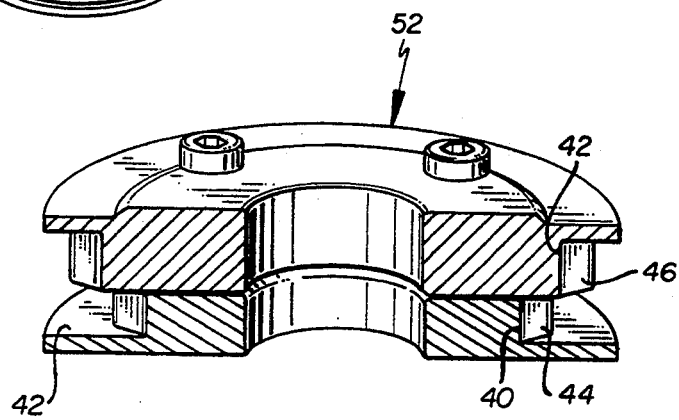
FIG. 5 is a cross-sectional view of a second embodiment.
Figure 6:
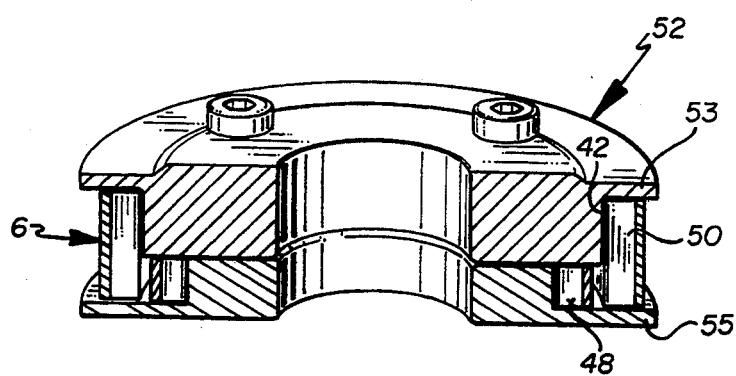
FIG. 6 is a cross-sectional view of the second embodiment of FIG. 5 including timing belts on the smaller and larger diameter belt engaging surfaces thereof.

In a second embodiment, shown in FIGS. 5 and 6, a recessed smaller or inner diameter belt engaging surface or longitudinal segment 40 is formed adjacent one side flange 45 rather than centrally as in the embodiment of FIG. 1. The inner pulley teeth 44 are carried on the smaller diameter surface 40 and the outer pulley teeth 46 are carried on the larger diameter surface or longitudinal segment 42. As is perhaps apparent, the pulley teeth 44 mesh with corresponding teeth on an inner belt 48 which rides below the outer belt 50. In this embodiment, the outer belt 50 rides on the larger diameter belt engaging surface 42, and the teeth 46 thereof engage the teeth on the outer belt 50. The belt 50 also rides on the outer surface of the inner belt 48. The side flanges 53 and 55 keep the outer belt 50 from running sideways in the grooved periphery 6. The second embodiment of the multiple belt timing pulley 52 can be used in the same way as the first embodiment shown in FIG. 4.

Figure 7:
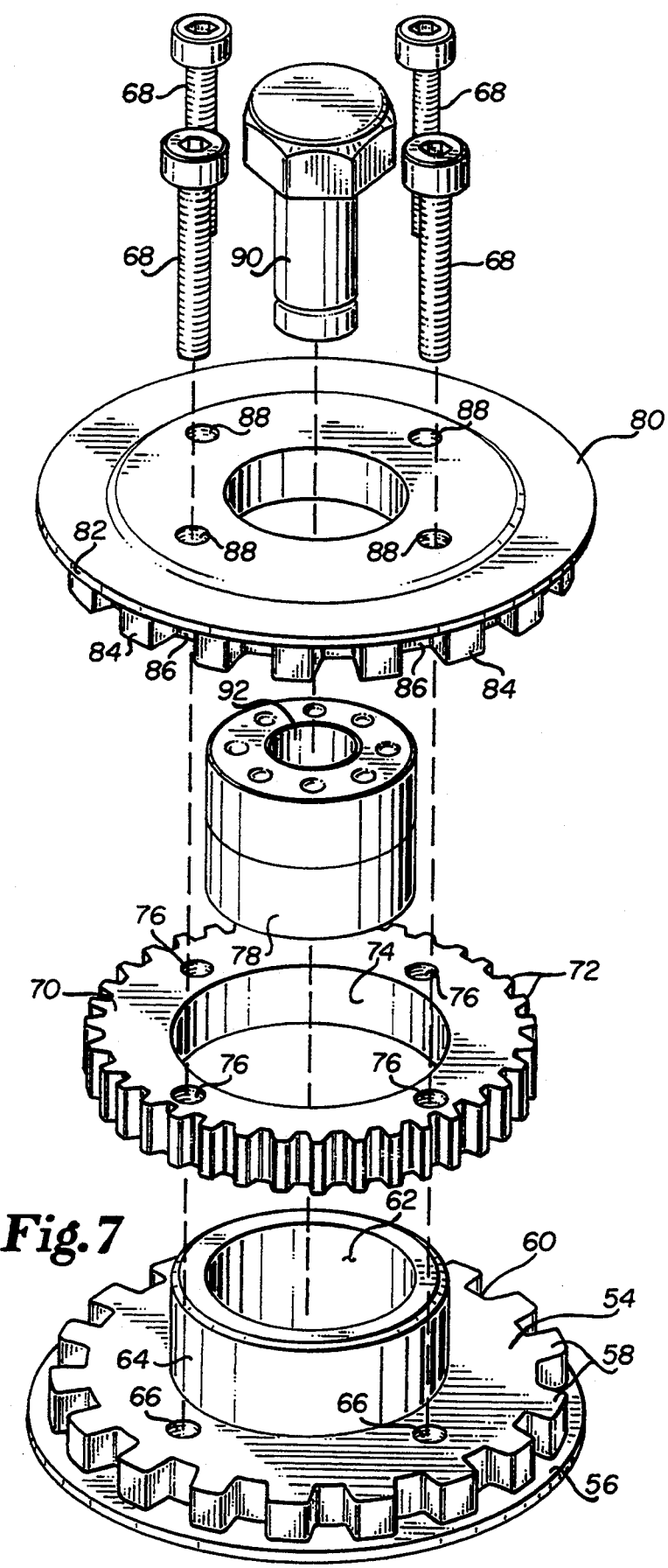
FIG. 7 is an exploded view of the embodiment of FIG. 1.

The multiple belt timing pulley may be constructed in a number of ways including one piece molding, machining a single piece of material or bolting various elements together. As shown in FIG. 7, a pulley constructed by bolting elements together may have a first toothed plate 54 having regularly circumferentially-spaced teeth 58 of a predetermined circular pitch and a central bore 62 surrounded by an annular hub 64. The annular hub 64 is centrally disposed and extends perpendicularly from the first toothed plate 54 and slidably fits inside a central bore 74 in a smaller diameter toothed plate 70. The smaller diameter plate 70 has pulley teeth 72 of a predetermined circular pitch formed on its periphery and four holes 76 which are large enough for threaded bolts 68 to pass through. A central bearing 78 fits within the central bore 62 and a second toothed plate 80 is added to hold the bearing 78 in place. Four threaded holes 66 are tapped into the first toothed plate 54, radially outward of the annular hub 64, for engaging the threaded bolts 68.

The side plate 80 has an annular rim flange 82 and regularly spaced teeth 84 of a predetermined circular pitch about its outer diameter 86. Four holes 88 are drilled in the side plate 80. These holes 88 and the tapped holes 66 are positioned to align the teeth, 58 and 84, for meshing with teeth on a corresponding outer timing belt.

The first toothed plate 54, the smaller diameter plate 70 and the side plate 80 are bolted together using the four bolts 68 to form the multiple belt timing pulley 2. The timing pulley 2 turns on an axle or shaft 90 inserted through a central bore 92 of the bearing 78. The second embodiment 52 may be constructed in a similar manner.

This invention has been described herein in considerable detail in order to comply with the patent statutes and to provide those skilled in the art with the information needed to apply to novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. A pulley, comprising a right circular cylinder having a stepped periphery defining a first, relatively large diameter longitudinal segment and a second relatively small diameter longitudinal segment, wherein said second longitudinal segment is recessed to split said first longitudinal segment into spaced side portions, each of said first and second longitudinal segments having regularly circumferentially-spaced teeth of a predetermined circular pitch.

2. The pulley as in claim 1 wherein the difference in diameter of said first and second longitudinal segments permits a first toothed belt of a predetermined thickness dimension to engage said second longitudinal segment beneath a second toothed belt engaging said first longitudinal segment.

3. The pulley as in claim 2 further comprising flange means extending above the regularly circumferentially-spaced teeth on each side of said first and second longitudinal segments for guiding the first and second toothed belts into engagement with the regularly circumferentially-spaced teeth.

4. The pulley as in claim 1 further comprising flange means extending above the regularly circumferentially-spaced teeth on each side of said first and second longitudinal segments for guiding first and second toothed belts into engagement with the regularly circumferentially-spaced teeth.

5. A pulley, comprising a right circular cylinder having a stepped periphery defining a first, relatively large diameter longitudinal segment and a second, relatively small diameter longitudinal segment wherein each of said first and second longitudinal segments have regularly circumferentially-spaced teeth of a predetermined circular pitch, and further wherein the difference in diameter of said first and second longitudinal segments permits a first toothed belt of a predetermined thickness dimension to engage said second longitudinal segment beneath a second toothed belt engaging said first longitudinal segment.

6. The pulley as in claim 5 wherein said second longitudinal segment is adjacent a side of said first longitudinal segment.

7. The pulley as in claim 6 further comprising flange means extending above the regularly circumferentially-spaced teeth on each side of said first and second longitudinal segments for guiding the first and second toothed belts into engagement with the regularly circumferentially-spaced teeth.

8. The pulley as in claim 5 wherein said second longitudinal segment is recessed to split said first longitudinal segment into spaced side portions.

9. The pulley as in claim 8 further comprising flange means extending above the regularly circumferentially-spaced teeth on each side of said first and second longitudinal segments for guiding the first and second toothed belts into engagement with the regularly circumferentially-spaced teeth.

10. The pulley as in claim 5 further comprising flange means extending above the regularly circumferentially-spaced teeth on each side of said first and second longitudinal segments for guiding the first and second toothed belts into engagement with the regularly circumferentially-spaced teeth.

11. A pulley, comprising:
   a) a right circular cylinder having a central bore and a stepped periphery defining a first, relatively large diameter longitudinal segment and a second, relatively small diameter longitudinal segment;

b) teeth means carried by each of said first and second longitudinal segments for engaging corresponding first and second toothed belts; and c) flange means extending above said teeth means on each side of said first and second longitudinal segments for guiding the first and second toothed belts into engagement with said teeth means.

12. The pulley as in claim 11 wherein the difference in diameter of said first and second longitudinal segments permits the second toothed belt to engage said second longitudinal segment beneath the first toothed belt engaging said first longitudinal segment.

13. The pulley as in claim 12 wherein said second longitudinal segment is recessed to split said first longitudinal segment into spaced side portions.

14. The pulley as in claim 12 wherein said second longitudinal segment is adjacent a side of said first longitudinal segment.

15. The pulley as in claim 11 wherein said second longitudinal segment is recessed to split said first longitudinal segment into spaced side portions.

16. The pulley as in claim 11 wherein said second longitudinal segment is adjacent a side of said first longitudinal segment.

* * * * *